US011336700B2

(12) United States Patent
Wang et al.

(10) Patent No.: US 11,336,700 B2
(45) Date of Patent: May 17, 2022

(54) SCALABLE REAL-TIME DUPLEX COMMUNICATIONS SERVICE (71) Applicant: Microsoft Technology Licensing, LLC, Redmond, WA (US)

(72) Inventors: Yawei Wang, Shanghai (CN); Le Zhao, Shanghai (CN); Ken Chen, Shanghai (CN); Xiaoyan Zhao, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/049,447

(22) PCT Filed: May 3, 2018

(86) PCT No.: PCT/CN2018/085401
§ 371 (c)(1),
(2) Date: Oct. 21, 2020

(87) PCT Pub. No.: WO2019/210474
PCT Pub. Date: Nov. 7, 2019

(65) Prior Publication Data
US 2021/0250388 A1 Aug. 12, 2021

(51) Int. Cl.
*H04L 65/1083* (2022.01)
*G06F 21/31* (2013.01)
(Continued)

(52) U.S. Cl.
CPC ......... *H04L 65/1083* (2013.01); *G06F 21/31* (2013.01); *H04L 9/3213* (2013.01);
(Continued)

(58) Field of Classification Search
CPC ............. H04L 65/1083; H04L 65/1063; H04L 65/105; H04L 67/12; H04L 67/10;
(Continued)

(56) References Cited

U.S. PATENT DOCUMENTS 6,226,684 B1   5/2001   Sung et al.
7,296,076 B1   11/2007  Portolani et al.
(Continued)

FOREIGN PATENT DOCUMENTS

CN   104731658 A     6/2015
WO   2015148816 A1   10/2015

OTHER PUBLICATIONS

"Session Management", Retrieved From: https://web.archive.org/web/20170718052955/https://aws.amazon.com/caching/session-management/, Jul. 18, 2017, 4 Pages.
(Continued)

*Primary Examiner* — Gil H. Lee
*Assistant Examiner* — Chhian (Amy) Ling
(74) *Attorney, Agent, or Firm* — Alleman Hall Creasman & Tuttle LLP (57) ABSTRACT One example provides a computing system configured to provide scalable, real-time duplex communications across a data network, the computing system comprising one or more processors, and storage comprising instructions executable by the one or more processors to instantiate one or more real-time duplex communication service instances. Each real-time duplex communication service instance comprises a real-time duplex communication framework comprising a client hub configured to receive connections for a plurality of clients and a server hub configured to receive connections for a plurality of servers, and each real-time duplex communication service instance is configured to publish messages regarding a state of the real-time duplex communication framework to a channel accessed by other real-time duplex communication service instances.

16 Claims, 4 Drawing Sheets (51) Int. Cl.
*H04L 9/32* (2006.01)
*H04L 65/1045* (2022.01)
*H04L 65/1063* (2022.01)
*H04L 67/02* (2022.01)
*H04L 67/10* (2022.01)
*H04L 67/12* (2022.01)
*H04L 67/51* (2022.01)
*H04L 29/06* (2006.01)

(52) U.S. Cl.
CPC .............. *H04L 63/06* (2013.01); *H04L 63/08* (2013.01); *H04L 65/105* (2013.01); *H04L 65/1063* (2013.01); *H04L 67/02* (2013.01); *H04L 67/10* (2013.01); *H04L 67/12* (2013.01); *H04L 67/16* (2013.01)

(58) Field of Classification Search
CPC ......... H04L 67/16; H04L 29/08; H04L 63/06; H04L 63/08; H04L 67/02; H04L 67/26; H04L 9/3213; G06F 21/31
See application file for complete search history.

(56) References Cited

U.S. PATENT DOCUMENTS

| | | | |
|---|---|---|---|
| 8,514,750 | B2 | 8/2013 | Allen et al. |
| 9,035,568 | B2 | 5/2015 | Ganton et al. |
| 2001/0052024 | A1 | 12/2001 | Devarakonda et al. |
| 2009/0177778 | A1 | 7/2009 | Turk et al. |
| 2011/0032847 | A1* | 2/2011 | Allen ...................... H04L 67/14 370/276 |
| 2013/0058262 | A1* | 3/2013 | Parreira .................. H04L 67/02 370/276 |
| 2014/0358988 | A1 | 12/2014 | Howard et al. |
| 2016/0344635 | A1 | 11/2016 | Lee et al. |
| 2016/0360569 | A1 | 12/2016 | Lubet et al. |
| 2017/0099353 | A1* | 4/2017 | Arora ...................... H04L 67/22 |
| 2017/0099362 | A1 | 4/2017 | Almond et al. |
| 2017/0344618 | A1 | 11/2017 | Horowitz et al. |
| 2018/0007059 | A1* | 1/2018 | Innes .................. G06F 21/6218 |
| 2018/0026970 | A1 | 1/2018 | Votaw et al. |
| 2018/0032573 | A1* | 2/2018 | Jarman .................. G16B 50/30 |
| 2018/0367526 | A1* | 12/2018 | Huang .................. H04L 63/105 |
| 2019/0158353 | A1* | 5/2019 | Johnson .............. H04L 61/2514 |

OTHER PUBLICATIONS

Fletcher, et al., "ASP.NET SignalR Hubs API Guide—Server (C#)", Retrieved From: https://docs.microsoft.com/en-us/aspnet/signalr/overview/guide-to-the-api/hubs-api-guide-server, Oct. 6, 2014, 32 Pages.

Osborne, James, "Introducing the Visual Studio Connected Service for Azure IoT Hub", Retrieved From <<https://azure.microsoft.com/en-in/blog/visual-studio-connected-service-for-azure-iot-hub/>>, Feb. 24, 2016, 4 Pages.

"International Search Report and Written Opinion Issued in PCT Application No. PCT/CN18/085401", dated Jan. 30, 2020, 9 Pages.

"Office Action Issued in European Patent Application No. 18917293. 5", dated Nov. 17, 2021, 11 Pages.

\* cited by examiner

SCALABLE REAL-TIME DUPLEX COMMUNICATIONS SERVICE

CROSS REFERENCE TO RELATED APPLICATIONS

The present application is a U.S. National Phase of International Patent Application Serial No. PCT/CN2018/085401 entitled "SCALABLE REAL-TIME DUPLEX COMMUNICATIONS SERVICE", filed May 3, 2018, the entire contents of which is hereby incorporated by reference for all purposes.

BACKGROUND

Real-time duplex communications may be used for various applications, such as online chat services. Real-time duplex communications systems may comprise one or more application servers operated by a server-side end user. However, scaling such systems by adding additional servers may pose challenges related to managing client connections to the multiple servers and synchronizing the states of the servers.

SUMMARY

Examples are disclosed herein that relate to a cloud-based service configured to provide real-time duplex communications across a data network in a manner that simplifies scaling for operators of communications applications. One example provides a computing system configured to provide scalable, real-time duplex communications across a data network, the computing system comprising one or more processors, and storage comprising instructions executable by the one or more processors to instantiate one or more real-time duplex communication service instances, each real-time duplex communication service instance comprising a real-time duplex communication framework comprising a client hub configured to receive connections for a plurality of clients and a server hub configured to receive connections for a plurality of servers, and each real-time duplex communication service instance being configured to publish messages regarding a state of the real-time duplex communication framework to a channel accessed by other real-time duplex communication service instances.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Real-time duplex communications systems may involve a large number of users communicating over a computer network in real time with each other as a group, such as via an online chat service. As the number of users increases, it may be challenging to scale up the service to accommodate the increased demand. This may result in delayed communications, dropped connections, and other network issues. Scaling such services typically involves adding additional application servers and utilizing load balancers. While this may help to reduce latency, this also may result in complex infrastructures that are difficult for the host entity to manage.

Figure 1:
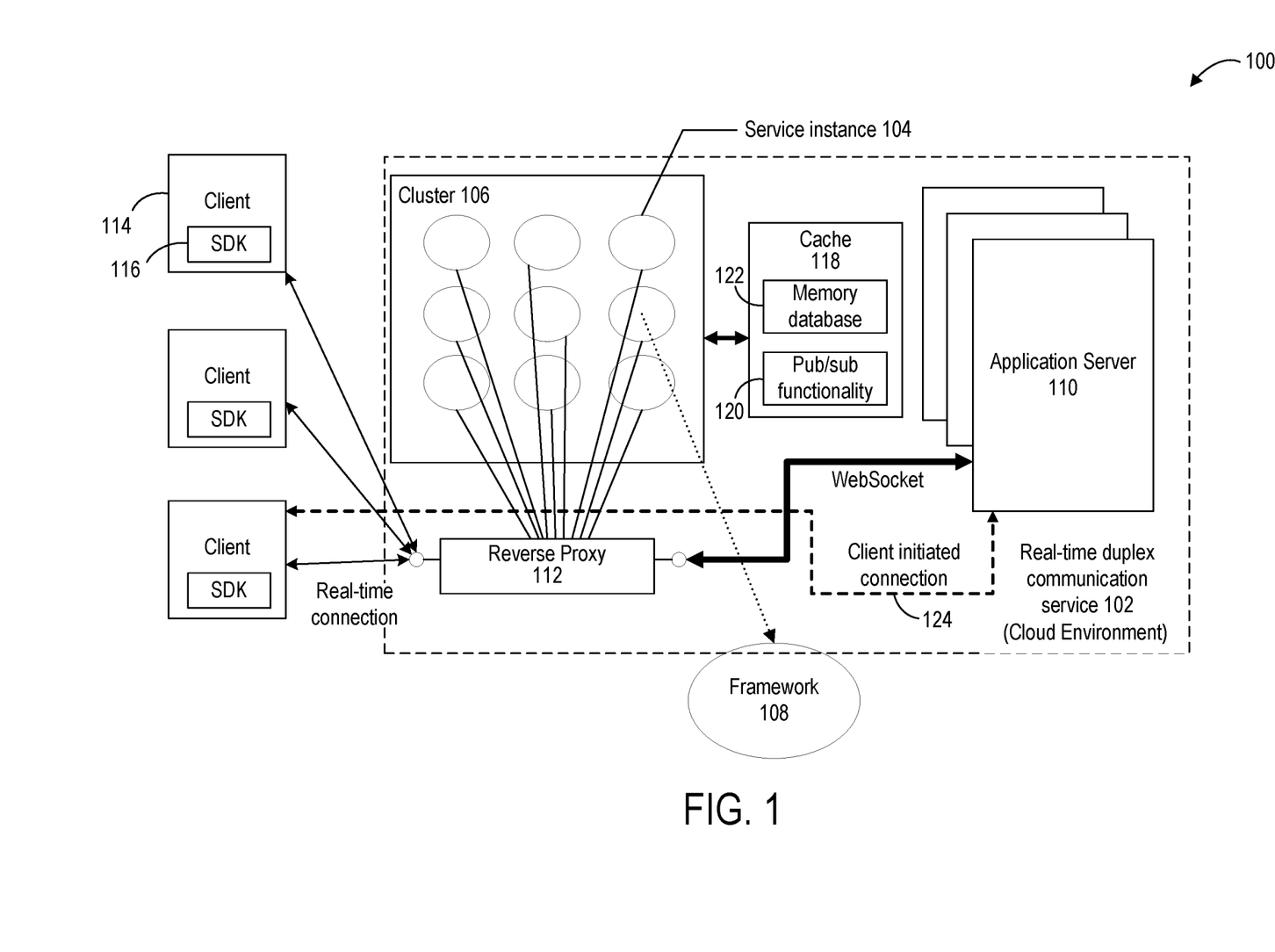
FIG. 1 shows a block diagram of an example data network architecture configured to provide scalable, real-time duplex communications.

Accordingly, examples are disclosed herein that relate to a cloud-based service configured to provide real-time duplex communications across a data network in a manner that simplifies scaling for operators of communications applications, such as chat service providers, online collaboration services, and multi-player online games. FIG. 1 shows an example data network architecture for a scalable, real-time duplex communications system 100. System 100 comprises a real-time duplex communication service 102, enacted in a cloud environment (e.g. a computing system that is hosted on the internet remotely from end user clients), which is configured to instantiate a cluster 106 of real-time duplex communication service instances 104. Each real-time duplex communication service instance 104 may comprise an operating system-level virtualization container, such as a Linux container or Windows container, or may comprise a virtual machine instance. Each real-time duplex communication service instance 104 runs a real-time duplex communications framework 108 to manage connections between client devices and application server devices. In some examples, the framework 108 may comprise a SignalR service, a software library available from the Microsoft Corporation of Redmond, WA that includes server-side and client-side components for real-time duplex communications. In other examples, any other suitable real-time duplex communication framework may be used. Each real-time duplex communication service instance 104 is depicted as communicating with the application servers 110 via the Web Socket protocol, but may utilize any suitable communications protocol that provides full-duplex communication channels, such as HTTP Long Polling or Server-Sent Event.

System 100 further includes a reverse proxy server 112 to distribute received messages from clients 114 to an appropriate real-time duplex communication service instance 104 for each client connection. The reverse proxy server 112 also forwards the messages from each real-time duplex communication service instance 104 to the appropriate application server 110, receives messages from the application server 110 for routing within cluster 106, and sends messages received from the application server 110 via the cluster 106 to the clients 114. Each client 114 is depicted as having components of a software development kit (SDK) 116 installed to implement communications with the real-time duplex communication service 102. FIG. 1 also shows a dashed line 124 illustrating a direct communication channel between a client and an application server. Such a channel may be used for client authentication, as described in more detail below.

As the real-time duplex communication service instances 104 are independent of one another, a backplane infrastructure may be utilized to synchronize communications among the real-time duplex communication service instances 104 in the cluster 106. Such synchronization may be performed in any suitable manner. In the depicted example, the real-time duplex communication service 102 comprises a cache 118 that has publication/subscription functionalities 120. Examples of suitable caches include in-memory key value databases, such as a Redis cache, available from Redis Labs of Mountain View, Calif. All real-time duplex communication service instances 104 in a cluster 106 may subscribe to a common channel of the publication/subscription functionality 120. When a client 114 connects to real-time duplex communication service instance 104 and sends a message, the real-time duplex communication service instance 104 publishes the message to the common channel of cache 118, thereby broadcasting the message to all other real-time duplex communication service instances 104 in the cluster 106. Then, each real-time duplex communication service instance 104 sends the message to its respective client connections via the reverse proxy server 112. The cache 118 also may act as an in-memory database 122 to store routing information for client-application server connections, as described in more detail below. While the publication/subscription and in-memory database functionalities are shown in FIG. 1 as being implemented by a same cache 118, in other examples the in-memory database and publication/subscription functions may be performed by separate components.

The use of real-time duplex communication service instances 104 allows an application server end user to easily scale a duplex real-time communication application by simply connecting additional application servers 110 to the real-time duplex communication service 102, without having to configure synchronization between the application servers 110 or manage a large number of client 114 connections to the application servers 110. Thus, the application server-side end users may simply rely on the real-time duplex communication service 102 to receive messages from clients 114, broadcast the messages to other clients 114, and maintain synchronization between different application servers 110. Where the volume of traffic exceeds that which can be efficiently managed by the currently instantiated framework instances 108, additional real-time duplex communication service instances 104 may be added, either by request from the application server-side end user, or automatically when a threshold load is met.

Figure 2:
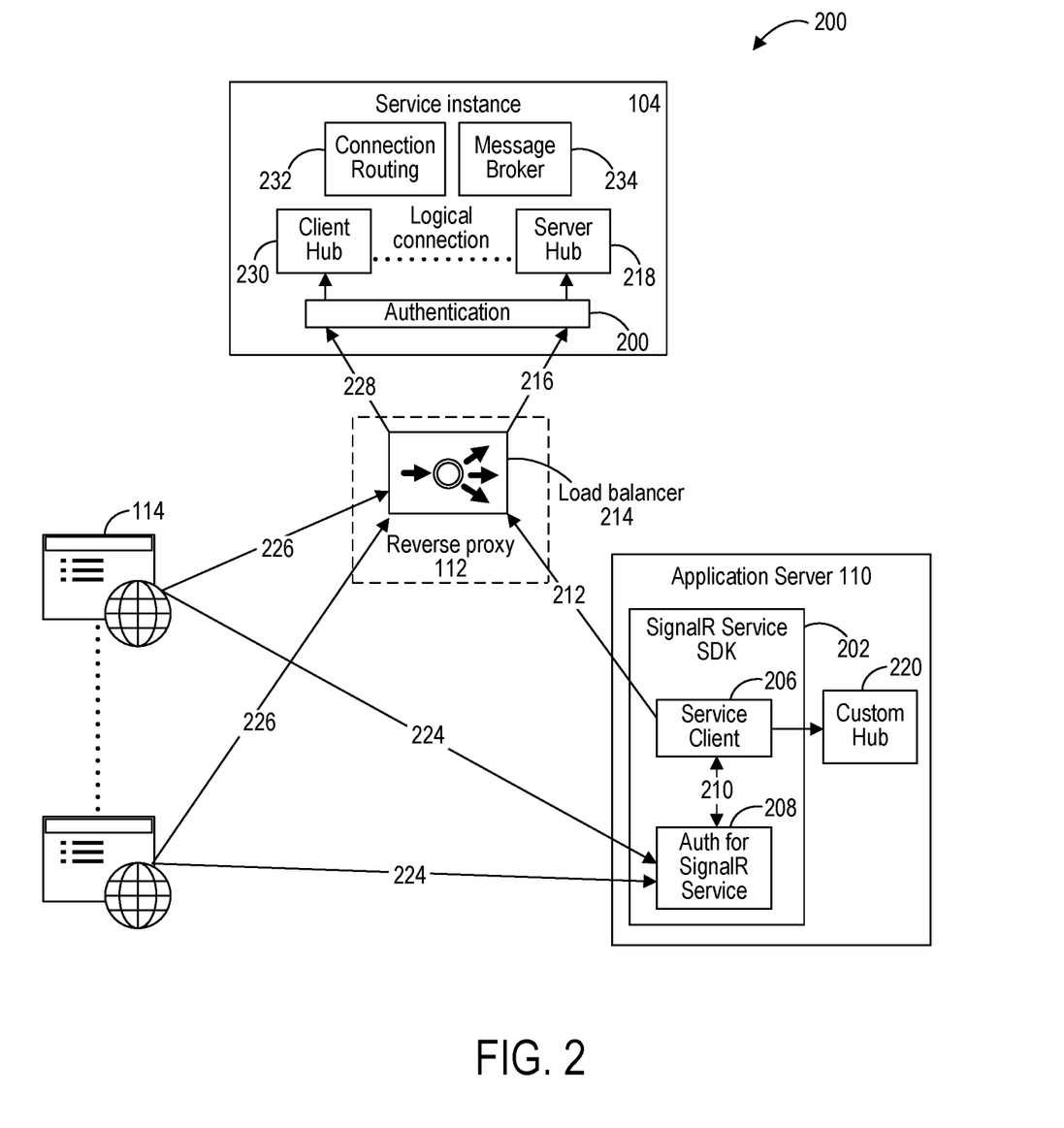
FIG. 2 shows an example network connection management flow for a real-time duplex communications service.

FIG. 2 shows an example network connection management flow for a real-time duplex communications service. In this example, a real-time duplex communication service SDK 202 is installed in the end user application server 110. The SDK 202 includes a service client 206 and an authentication module 208 for authenticating clients, for example an application programming interface (API) to generate JavaScript Object Notation (JSON) Web Tokens for authentication. At 210, the service client 206 receives a service Uniform Resource Locator (URL) and a JSON Web Token from the authentication module 208. At 212, the service client 206 uses these results from 210 to connect to a real-time duplex communication service instance 104 via a load balancer 214 of the reverse proxy server 112. The load balancer 214 routes the application server connection to the real-time duplex communication service instance 104 for authentication. If authentication passes, at 216, a connection between the application server 110 and a server hub 218 of the real-time duplex communication service instance 104 is successfully established. The load balancer 214 may manage more than one connection between the server hub 218 and the application server 110, and may select a connection based upon load. Further, the server hub 218 may connect to a plurality of other application servers, on the order of multiple tens of application servers in some examples.

The application server 110 also includes a custom hub 220 which serves as an entry point for users to write their own application logic for sending to the real-time duplex communication service instance 104 via SDK 202. The real-time duplex communication service instance 104 may allocate a separate hub for the user in the real-time duplex communication service instance 104, which may be isolated from other existing hubs for the user.

Regarding client connections, clients 114, such as web pages or mobile applications, first send requests to the authorization module 208 of the application server 110, as shown at 224. This is an example of communication 124 of FIG. 1. The authentication module 208 returns an authentication token (e.g. a JSON Web Token) and a real-time duplex communication service endpoint for each client. Once a client 114 receives the authentication token from the application server 110, the client 114 may use the token to authenticate with the real-time duplex communication service instance 104, as indicated at 226. After authentication passes at 228, the client 114 successfully establishes a connection at 228 with a client hub 230 of the real-time duplex communication service instance 104. Client hub 230 is configured to connect to a plurality of other clients as well, serving as a common connection point for potentially thousands of client connections. The real-time duplex communication service instance 104 also routes and establishes a connection between the client hub 230 and the server hub 218 to form a logical connection between the client and an application server via a connection routing module 232, as described in more detail below. Service instance 104 additionally includes a message broker service 234 to shuttle messages and data between the clients 114 and the application server 110.

After a client connection has been established with the client hub, the client connection is routed to server connections at the server hub, as described above with regard to FIG. 2. A least-connections algorithm or other suitable load balancing algorithm may be utilized to determine routing between the clients and servers, as many possibilities may exist in a distributed system. The routing process may determine, for example, whether a user has already connected to a server previously. If so, the service may attempt to route the user to that server that the user has been connected to before (a cached routing result), thus enabling "sticky sessions."

Figure 3:
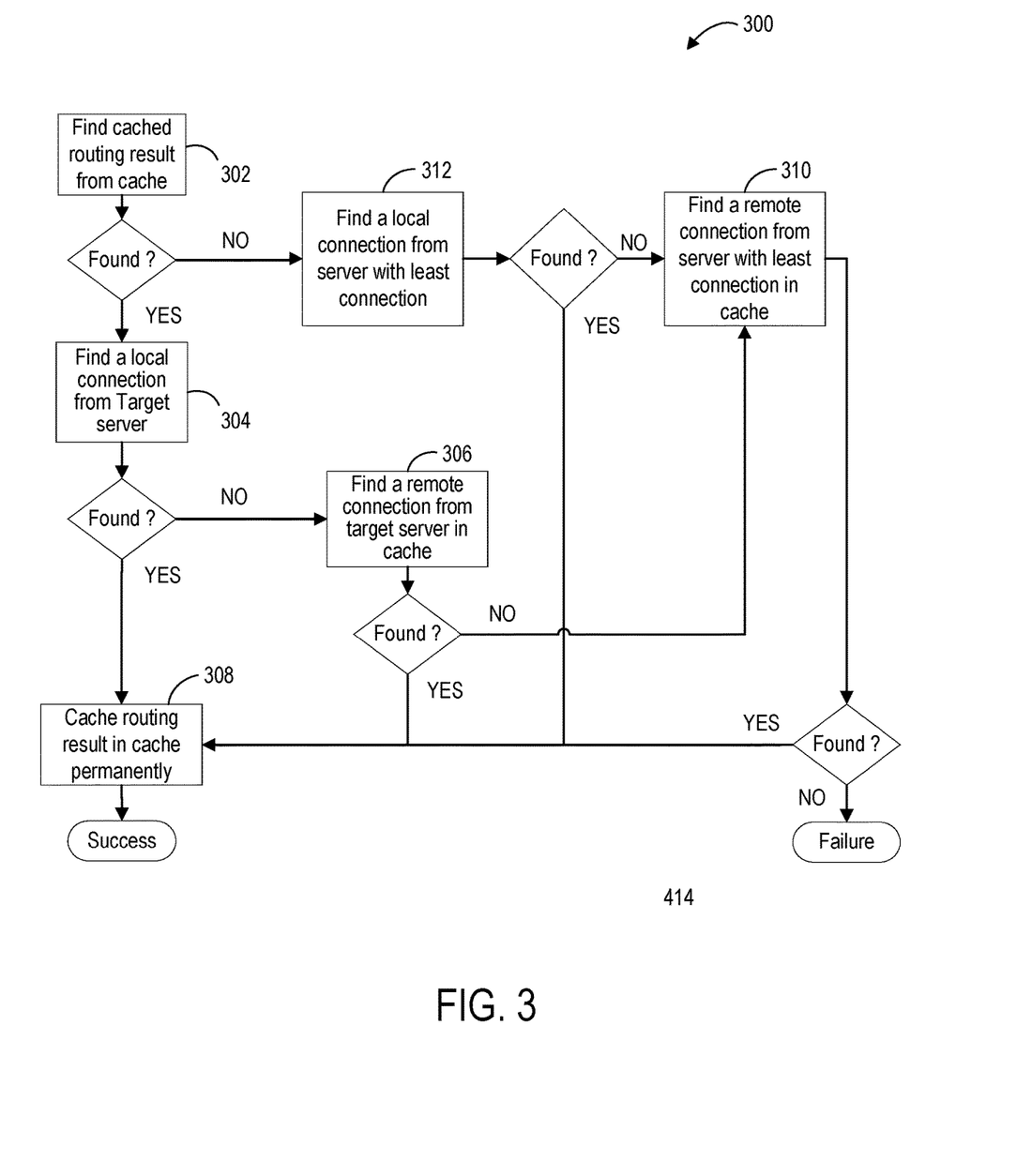
FIG. 3 shows a flow diagram illustrating an example method of routing received client messages.

FIG. 3 is a flow diagram showing an example method 300 of routing received client messages in a real-time duplex communications service. Method 300 may be performed, for example, by the connection routing module 232 of FIG. 2. The flow shown in FIG. 3 may be performed for each client message received. For each client connection, the service may assume that the client user has a unique userID, and may utilize the userID to record a session in the service. Whenever a new client connection is created, the service may determine if the userID has been saved in any previous sessions for this userID. Thus, method 300 includes, at 302, searching for a cached routing result from Redis (or other suitable cache). If a cached routing result is found, the service will attempt to route the user to the same server that the user was connected to before, and search for a local connection from that server in a current real-time duplex communication service instance. As such, method 300 includes, at 304, searching for a local connection from the target server (the server associated with the previous connection) in the current real-time duplex communication service instance. If a local connection from the target server is found in the current instance, the client connection may be locally established. The service then saves this routing result in the cache for future connections, at 308.

On the other hand, if at 304, a local connection from the target server is not found in the current real-time duplex communication service instance, then method 300 includes, at 306, searching for a remote connection from the target service in other real-time duplex communication service instances. Searching for such a remote connection may include sending a query to an in-memory key value database of the cache, and receiving information from the cache regarding container instances outside of the current container instance, as the memory database includes global information regarding all container instances and connections as obtained from the publication/subscription function described above. If a remote connection from the target server is found in another container instance at 306, this remote connection is established and cached as a routing, at 308. Thus, for future connections, this remote connection may be identified as the new, local connection in the next pass through. However, if a remote connection from the target server also cannot be found, this may indicate that the target server has been shut down or is otherwise not available, as no connections can be found from that server. In that case, the service will attempt to find another connection from other servers, at 310. A least-connections or load balancing algorithm, or other suitable algorithm, may be used to identify a remote connection from a server with the least number of connections. If a remote connection from another server is found, this routing result is cached at 308. If a remote connection still cannot be found, the routing process results in failure, and the client connection may be closed.

Returning to 302, if a cached routing result is not initially found, method 300 includes searching for a local connection from another server with a least number of connections, at 312. This may be performed in some examples by a least-connections or load balancing algorithm, as mentioned above. If such a local connection from another server is found, this routing result is cached at 308. If such a local connection cannot be found, method 300 comprises searching for a remote connection, at 310.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
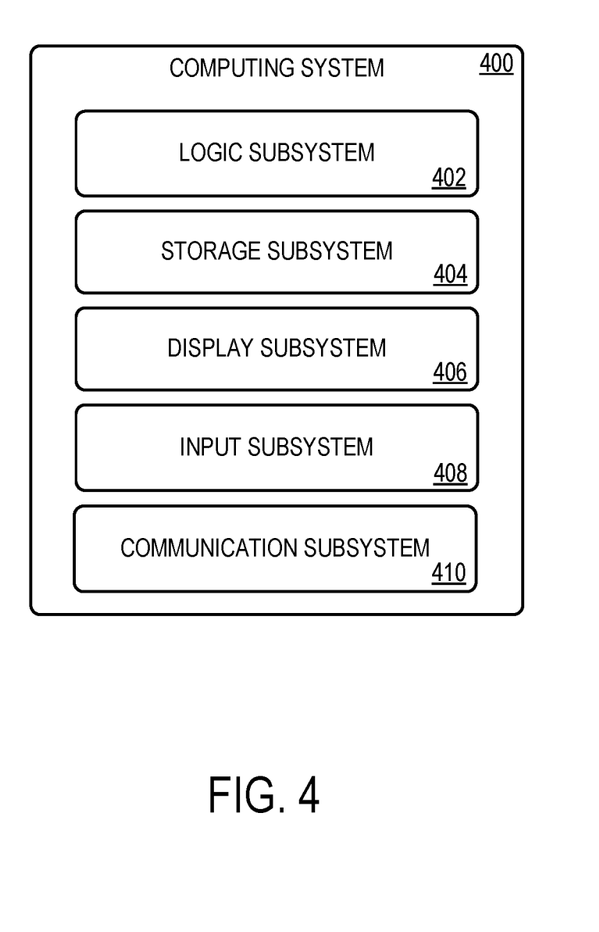
FIG. 4 shows a block diagram of an example computing device.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic subsystem 402 and a storage subsystem 404. Computing system 400 may optionally include a display subsystem 406, input subsystem 408, communication subsystem 410, and/or other components not shown in FIG. 4.

Logic subsystem 402 includes one or more physical devices configured to execute instructions. For example, the logic subsystem 402 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 402 may include one or more processors configured to execute software instructions. Additionally or alternatively, the logic subsystem 402 may include one or more hardware or firmware logic machines configured to execute hardware or firmware instructions. Processors of the logic subsystem 402 may be single-core or multi-core, and the instructions executed thereon may be configured for sequential, parallel, and/or distributed processing. Individual components of the logic subsystem 402 optionally may be distributed among two or more separate devices, which may be remotely located and/or configured for coordinated processing. Aspects of the logic subsystem 402 may be virtualized and executed by remotely accessible, networked computing devices configured in a cloud-computing configuration.

Storage subsystem 404 includes one or more physical devices configured to hold instructions executable by the logic subsystem 402 to implement the methods and processes described herein. When such methods and processes are implemented, the state of storage subsystem 404 may be transformed—e.g., to hold different data.

Storage subsystem 404 may include removable and/or built-in devices. Storage subsystem 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 404 may include volatile, nonvolatile, dynamic, static, read/write, read-only, random-access, sequential-access, location-addressable, file-addressable, and/or content-addressable devices.

It will be appreciated that storage subsystem 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 402 and storage subsystem 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" and "program" may be used to describe an aspect of computing system 400 implemented to perform a particular function. In some cases, a module or program may be instantiated via logic subsystem 402 executing instructions held by storage subsystem 404. It will be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage subsystem 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic subsystem 402 and/or storage subsystem 904 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem 410 may be configured for communication via a wireless telephone network, or a wired or wireless local- or wide-area network. In some embodiments, the communication subsystem 410 may allow computing system 400 to send and/or receive messages to and/or from other devices via a network such as the Internet.

Another example provides a computing system configured to provide scalable, real-time duplex communications across a data network, the computing system comprising one or more processors, and storage comprising instructions executable by the one or more processors to instantiate one or more real-time duplex communication service instances, each real-time duplex communication service instance comprising a real-time duplex communication framework comprising a client hub configured to receive connections for a plurality of clients and a server hub configured to receive connections for a plurality of servers, and each real-time duplex communication service instance being configured to publish messages regarding a state of the real-time duplex communication framework to a channel accessed by other real-time duplex communication service instances. The instructions may be additionally or alternatively executable to connect each client of the plurality of clients to an application server of a plurality of application servers. The instructions may be additionally or alternatively executable to publish messages to the channel accessed by other real-time duplex communication service instances comprise instructions executable to implement a publish/subscribe functionality of an in-memory key value database. The in-memory key value database may additionally or alternatively include a Redis cache. The real-time duplex communication framework may additionally or alternatively include a SignalR framework. The one or more service instances each may additionally or alternatively include an operating system-level virtualization container instance. The one or more service instances each may additionally or alternatively include a virtual machine instance. The instructions may be additionally or alternatively executable to instantiate an additional container based on one or more of a client traffic load and a request from an application server entity. The computing system may additionally or alternatively include a reverse proxy server to route connections from the plurality of clients to the one or more real-time duplex communication service instances. The instructions may be additionally or alternatively executable to, upon receiving a message from a client, search for a cached routing result from an in-memory key value database, and if no cached routing result is found, search for a connection from a server with a fewest number of connections, and when the connection from the server with the fewest number of connections is found, cache the connection from the server with the fewest number of connections as a routing result in the in-memory key value database. The instructions may be additionally or alternatively executable to, when the cached routing result is found, search for a local connection from a target server in the in-memory key value database. The instructions may be additionally or alternatively executable to, if the local connection from the target server is not found, search for a remote connection from the target server in the in-memory key value database, and when the remote connection is found, caching the remote connection as a routing result in the in-memory key value database.

Another example provides, on a network-accessible communication computing system, a method of operating a real-time duplex communication service, the method comprising instantiating one or more real-time duplex communication service instances, each real-time duplex communication service instance comprising a real-time duplex communication framework and being instantiated in an operating system-level virtualization container instance or a virtual machine, receiving connections for a plurality of clients at a client hub of the real-time duplex communication framework, receiving connections for a plurality of application servers at a server hub of the real-time duplex communication framework, and at each service instance, publishing messages regarding a state of the real-time duplex communication framework to a channel accessed by other real-time duplex communication service instances. The method may additionally or alternatively include, upon receiving a client connection, searching for the connection in an in-memory key value database. Publishing messages to the channel accessed by other real-time duplex communication service instances may additionally or alternatively include utilizing a publish/subscribe functionality of an in-memory key value database. The method may additionally or alternatively include instantiating an additional container based on one or more of a client traffic load and a request from an application server entity.

Another example provides an application server computing system, comprising a processor, and storage comprising instructions executable by the processor to authenticate the application server for connecting to the network-accessible real-time duplex communications system, connect to the network-accessible real-time duplex communication system, receive an authentication request from a client, provide an authentication token for the client to access the network-accessible real-time duplex communications service, and communicate with the client via the network-accessible real-time duplex communication service after the client authenticates itself with the network-accessible, real-time duplex communication service via the authentication token.

The instructions may be additionally or alternatively executable to authenticate the application server by authenticating a service client of the application server with an authentication module of the application server. The instructions may be additionally or alternatively executable to receive, at the service client of the application server, an authentication token from the authentication module of the application server, and to provide the authentication token to the network-accessible real-time duplex communication system. The authentication token may additionally or alternatively include a JSON Web Token.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system configured to provide a scalable, real-time duplex communications service, the computing system comprising
   one or more processors; and
   storage comprising instructions executable by the one or more processors to instantiate one or more real-time duplex communication service instances, each real-time duplex communication service instance comprising a real-time duplex communication framework comprising a client hub configured to receive connections for a plurality of clients and a server hub configured to receive connections for a plurality of servers, and each real-time duplex communication service instance being configured to publish messages regarding a state of the real-time duplex communication framework to a channel accessed by other real-time duplex communication service instances, and to instantiate an additional real-time duplex communication service instance to scale up the real-time duplex communications service.

2. The computing system of claim 1, further comprising instructions executable to connect each client of the plurality of clients to an application server of a plurality of application servers.

3. The computing system of claim 1, wherein the instructions executable to publish messages to the channel accessed by other real-time duplex communication service instances comprise instructions executable to implement a publish/subscribe functionality of an in-memory key value database.

4. The computing system of claim 3, wherein the in-memory key value database comprises a Redis cache.

5. The computing system of claim 1, wherein the real-time duplex communication framework comprises a SignalR framework.

6. The computing system of claim 1, wherein the one or more service instances each comprises an operating system-level virtualization container instance.

7. The computing system of claim 1, wherein the one or more service instances each comprises a virtual machine instance.

8. The computing system of claim 1, further comprising instructions executable to instantiate an additional container based on one or more of a client traffic load and a request from an application server entity.

9. The computing system of claim 1, further comprising a reverse proxy server to route connections from the plurality of clients to the one or more real-time duplex communication service instances.

10. The computing system of claim 1, further comprising instructions executable to
    upon receiving a message from a client, search for a cached routing result from an in-memory key value database, and
    if no cached routing result is found, search for a connection from a server with a fewest number of connections, and when the connection from the server with the fewest number of connections is found, cache the connection from the server with the fewest number of connections as a routing result in the in-memory key value database.

11. The computing system of claim 10, wherein the instructions are executable to, when the cached routing result is found, search for a local connection from a target server in the in-memory key value database.

12. The computing system of claim 11, wherein the instructions are executable to, if the local connection from the target server is not found, search for a remote connection from the target server in the in-memory key value database, and when the remote connection is found, caching the remote connection as a routing result in the in-memory key value database.

13. On a network-accessible communication computing system, a method of operating a real-time duplex communication service, the method comprising:
    instantiating one or more real-time duplex communication service instances, each real-time duplex communication service instance comprising a real-time duplex communication framework and being instantiated in an operating system-level virtualization container instance or a virtual machine,
    receiving connections for a plurality of clients at a client hub of the real-time duplex communication framework,
    receiving connections for a plurality of application servers at a server hub of the real-time duplex communication framework,
    at each service instance, publishing messages regarding a state of the real-time duplex communication framework to a channel accessed by other real-time duplex communication service instances, and
    instantiating an additional real-time duplex communication service instance to scale up the real-time duplex communication service.

14. The method of claim 13, further comprising, upon receiving a client connection, searching for the connection in an in-memory key value database.

15. The method of claim 13, wherein publishing messages to the channel accessed by other real-time duplex communication service instances comprises utilizing a publish/subscribe functionality of an in-memory key value database.

16. The method of claim 13, further comprising instantiating an additional container based on one or more of a client traffic load and a request from an application server entity.

* * * * *